United States Patent [19]

Tumminelli et al.

[11] Patent Number: 5,178,658
[45] Date of Patent: Jan. 12, 1993

[54] METHOD FOR FORMING AN OPTICAL WAVEGUIDE BY SELECTIVE VOLATIZATION

[75] Inventors: Richard P. Tumminelli, Ashland; Farhad Hakimi, Watertown; John R. Haavisto, Marshfield Hills, all of Mass.

[73] Assignee: The Charles Stark Draper Laboratory, Inc., Cambridge, Mass.

[21] Appl. No.: 761,416

[22] Filed: Sep. 17, 1991

[51] Int. Cl.⁵ ............................................... C03C 15/00
[52] U.S. Cl. ..................................... 65/30.1; 65/3.11; 65/31; 65/111; 65/3.14; 156/663; 219/121.8; 219/121.29; 385/129; 385/130; 427/162; 427/375.2; 427/586; 427/596
[58] Field of Search ........................ 65/31, 30.1, 60.53, 65/3.14, 60.2, 111, 117, 102; 156/663; 219/121.29, 121.8; 427/35, 36, 162, 167, 53.1, 372.2, 375, 376.2, 397.7; 385/129, 130

[56] References Cited

U.S. PATENT DOCUMENTS

| | | | |
|---|---|---|---|
| 4,676,820 | 6/1987 | LeSergent et al. | 65/70 |
| 4,756,734 | 7/1988 | Kersten et al. | 65/18.2 |
| 4,765,819 | 8/1988 | Kersten et al. | 65/31 |
| 4,886,538 | 12/1989 | Mahapatra | 65/30.1 |

FOREIGN PATENT DOCUMENTS 61-158303 7/1986 Japan .

*Primary Examiner*—Robert L. Lindsay
*Attorney, Agent, or Firm*—Iandiorio & Dingman

[57] ABSTRACT

A method of forming an optical waveguide which includes the steps of forming on a substrate a waveguide layer including at least one host medium and one dopant medium, one of which is more volatile than the other; and heating the waveguide layer to selectively volatize the more volatile medium along a path, raising the index of refraction and creating a waveguide along the path.

11 Claims, 3 Drawing Sheets

METHOD FOR FORMING AN OPTICAL WAVEGUIDE BY SELECTIVE VOLATIZATION

FIELD OF INVENTION

This invention relates to a method of forming an optical waveguide, and more particularly to such a method which selectively volatizes a constituent to raise the index of refraction along a path and create a waveguide.

BACKGROUND OF INVENTION

Planar waveguides in glass have been of interest for some time for making low-cost, high-performance passive optical components such as ring resonators, couplers, splitters and wavelength division multiplexers. Currently, two processes are widely used for making planar waveguides in glass. The first method is ion exchange that uses a glass substrate containing mobile ions which can be locally exchanged for another ion which will increase the refractive index. For example, a glass containing sodium ions could be masked to define a waveguide path, then immersed in a molten potassium salt bath where the sodium would be exchanged for the potassium, which would result in a higher index of refraction in the path and create a waveguide. This ion exchange technique has certain shortcomings. The waveguide is formed on the surface of the glass and losses are associated with the top surface roughness and with ionic defects occurring during the exchange. Recent advances in this technology have led to propagation losses of 0.01 dB/cm, but this requires careful fabrication techniques including judicious choice of materials and glass substrate composition and precise process control. Another technique is to grow glass on a silicon substrate by flame hydrolysis deposition (FHD) and form waveguides by reactive ion etching. Losses of 0.01 dB/cm have been achieved. This process is the same as that which is used to make fiber optic preforms from which telecommunications grade fiber can be drawn. The fiber has a loss of 1 dB/Km or $10^{-5}$ dB/cm, three orders of magnitude lower than losses achieved in planar form. The material, therefore, cannot be the cause of the losses in planar form. Waveguides formed by this process employ masking and subsequent etching to remove portions of the substrate and leave the raised, ribbed waveguide. A number of different etching techniques can be used. Etching techniques, however, leave the ribbed waveguide with rough edges that contribute to higher losses. Further processing is required to attempt to reduce the roughness and produce smoother boundaries.

SUMMARY OF INVENTION: I

It is therefore an object of this invention to provide an improved method of forming an optical waveguide.

It is a further object of this invention to provide such an improved method for more easily and inexpensively fabricating a lower loss waveguide.

It is a further object of this invention to provide such an improved method for fabricating a low loss waveguide without etching.

It is a further object of this invention to provide such an improved method which results in a waveguide having a more uniform index of refraction profile along its length.

The invention results from the realization that a lower loss, optical waveguide can be made by forming on a substrate a waveguide layer which includes a host medium and a dopant medium, one of which is more volatile than the other, and then heating the layer to selectively volatize the more volatile medium along a path on the layer to locally raise the index of refraction and create a waveguide along the path.

This invention features a method of forming an optical waveguide including forming on a substrate a waveguide layer including at least one host medium and one dopant medium, one of which is more volatile than the other, and heating the waveguide layer to selectively volatize the more volatile medium along a path to raise the index of refraction and creating a waveguide along the path.

In a preferred embodiment, the forming includes depositing the layer. The host medium may include silica and the dopant medium may include at least one dopant which is more volatile than the host medium. The heating of the waveguide layer to selectively volatize may include irradiating the path with a particle beam or a photon beam, such as a laser beam. Alternatively, the heating of the waveguide to selectively volatize may include covering the layer with a blocking mask which exposes the area of the path and increasing the temperature of the layer to volatize the more volatile medium in the exposed path. Generally the dopant medium contains at least one dopant which is more volatile than the host medium. Alternatively, the host medium may be more volatile than the dopant medium such as when the host is silica and the dopant is aluminum.

This invention more specifically features a method of forming an optical waveguide including depositing on a substrate a silica layer containing a dopant medium including at least one volatile dopant, and irradiating with a laser beam a path along the layer for heating and selectively volatizing the at least one volatile dopant and raising the index of refraction of the layer to create a waveguide along the irradiated path.

In a preferred embodiment the dopant medium includes an index of refraction lowering dopant. The dopant medium may include but a single index of refraction lowering dopant. The index of refraction lowering dopant may be boron or fluorine. The dopant medium may include an index of refraction raising dopant and an index of refraction lowering dopant which is more volatile than the index of refraction raising dopant. The refractive index raising dopant may be aluminum and the more volatile index of refraction lowering dopant may be boron. The dopant medium may include a plurality of dopants each of which separately tend to raise the index of refraction of the layer and in combination have an effect on the index of refraction which is less than the cumulative effect of each of the dopants. The dopant medium may include aluminum and phosphorous, where phosphorous is the more volatile dopant. The substrate may be silica.

DISCLOSURE OF PREFERRED EMBODIMENT

Other objects, features and advantages will occur to those skilled in the art from the following description of a preferred embodiment and the accompanying drawings, in which.

Figure 4:
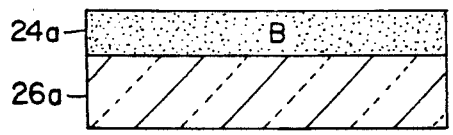
FIG. 4 is a side elevational schematic view of a substrate bearing a boron-doped silica layer.
Figure 10:
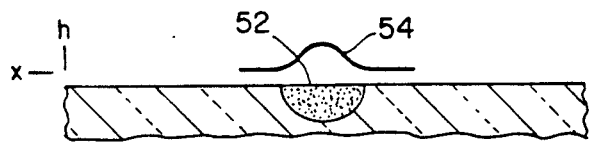
Figure 11:
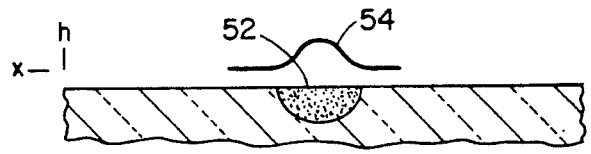
Figure 12:
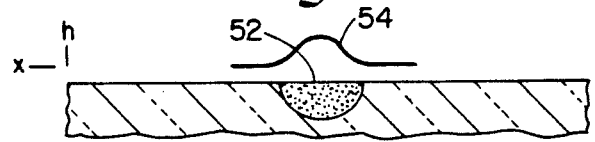
Figure 13:
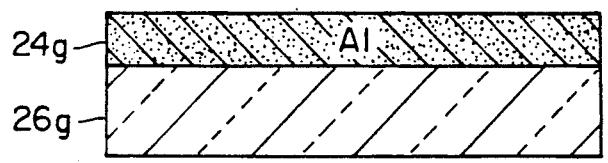
Figure 14:
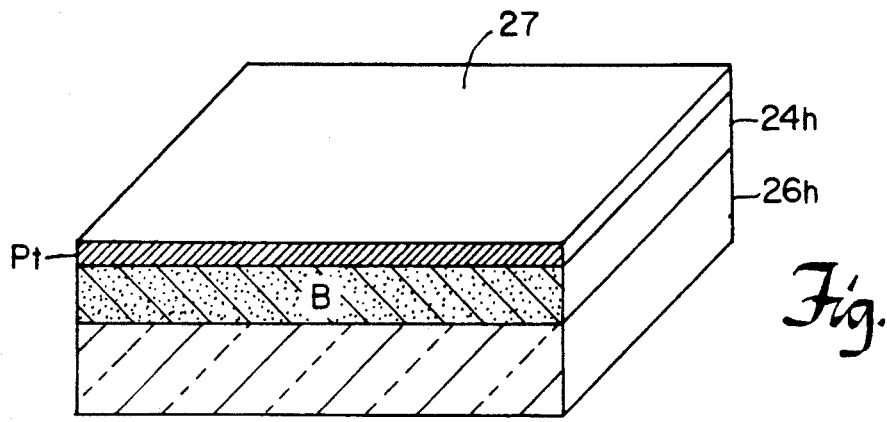
Figure 15:
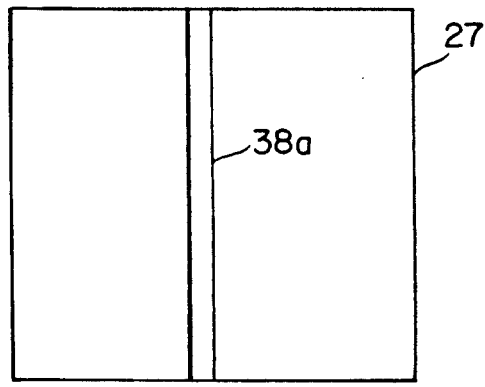
Figure 16:
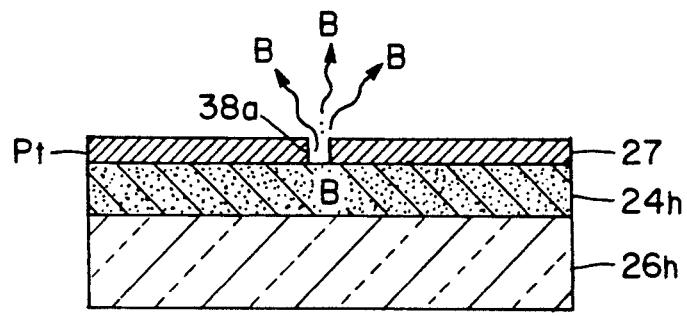

FIGS. 10, 11 and 12 illustrate the cross-sectional index of refraction profile at three arbitrary points at sectional lines 10—10, 11—11 and 12—12, respectively;

FIG. 13 is a view similar to FIG. 4 of an aluminum doped silica layer;

FIG. 14 is a three-dimensional view of a substrate bearing a boron doped silica layer such as shown in FIG. 4, where the boron doped silica layer is covered with a platinum layer;

FIG. 15 is a top view of the substrate bearing the boron doped silica layer of FIG. 14 with the platinum layer etched away in a path to form a waveguide; and FIG. 16 is an end view of the boron doped silica layer substrate of FIGS. 14 and 15 being heated to drive off the boron in the region exposed by the etched path in the platinum layer.

This invention may be accomplished by forming on a substrate a waveguide layer including at least one host medium and one dopant medium, one of which is more volatile than the other, and then heating the waveguide layer to selectively volatize the more volatile medium along a path to raise the index of refraction and create a waveguide along that path. As referred to herein, a material is volatile when compared to other materials when it has a higher vapor pressure at a particular temperature than the materials it is being compared with. In most cases the host medium is the less volatile and the dopant medium, or at least one of the dopants in the dopant medium, is more volatile. In some cases, as where aluminum is the dopant, the host silica, which has a lower index of refraction, may be driven off to leave a higher concentration of the higher index of refraction, lower volatility aluminum.

The step of forming may include depositing the layer, such as by flame hydrolysis deposition, or growing it as in a germanium crystal growing process. The host medium may include silica and the dopant medium may include at least one dopant which is more volatile than the host medium. Alternatively, the host medium such as silica can be more volatile than the dopant medium, for example where the host medium is silica and the dopant is aluminum. The heating of the waveguide to volatize the path may include irradiating the path with a particle beam or a photon beam, e.g. a laser beam. Alternatively, the heating to selectively volatize may be done by covering the layer with a blocking mask which exposes the area of the path and then increasing the temperature of the layer to volatize the more volatile medium in the region of the exposed path.

More specifically, the invention may be achieved in a method for forming an optical waveguide by depositing on a substrate a silica layer containing a dopant medium including at least one volatile dopant. The deposition may be done by flame hydrolysis deposition or a solgel process, for example. A laser beam is then used to irradiate a path along the layer for heating and selectively volatizing the at least one volatile dopant, and locally raising the index of refraction of the layer in that area struck by the laser beam to create a waveguide along the irradiated path. The substrate itself may also be made of silica. The dopant medium may include just one dopant or a plurality of dopants. The single dopant for example may include boron or fluorine, which lowers the index of refraction of the silica. Thus when the laser beam irradiates and volatizes the dopant such as boron or fluorine and drives it off, the index of refraction increases back toward that of the basic silica layer. For example, a boron dopant, such as boron oxide, is much more volatile than silica. When the silica is heated to a high enough temperature the boron is selectively volatized, leaving behind an area depleted in boron with a refractive index higher than the surrounding material. If the dopant is fluorine, the same process occurs but the heat treatment is done in oxygen and the fluorine is volatized out of the glass matrix by being replaced by oxygen and leaving behind the high-index glass. This technique produces surface waveguides which have very smooth surfaces and boundaries due to the very nature of the technique being a thermal process.

Figure 1:
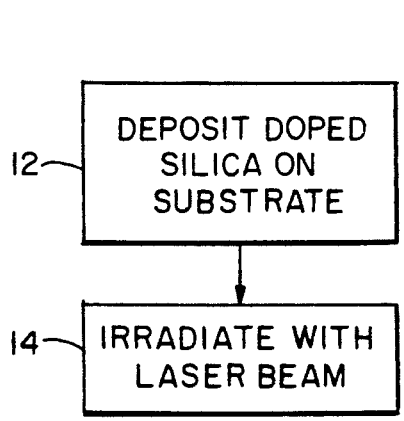
FIG. 1 is a simplified block diagram of the method according to this invention.

There is shown in FIG. 1 a simplified diagram of the method 10 of forming an optical waveguide which includes first depositing a doped silica layer on a substrate in step 12, and then irradiating a predetermined path along the layer with a laser beam in step 14 to volatize the dopant or one of the dopants to increase the index of refraction along the predetermined path, thereby creating a waveguide.

Figure 2:
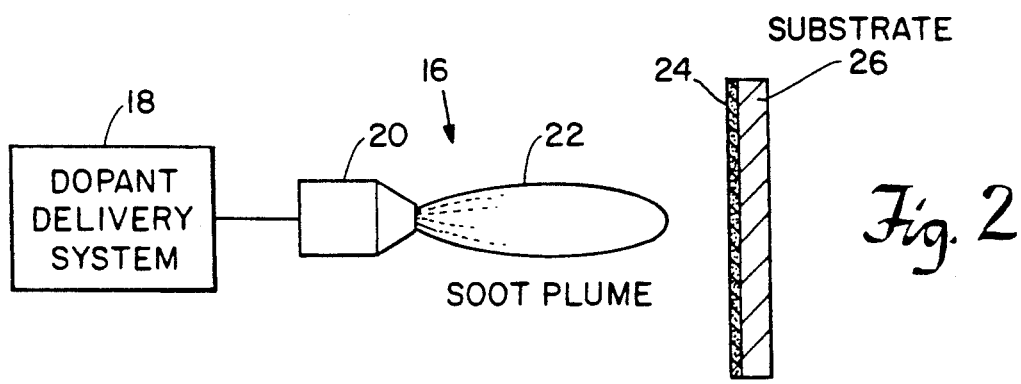
FIG. 2 is a schematic diagram of a flame hydrolysis deposition apparatus for depositing a silica layer on a substrate according to this invention.
Figure 3:
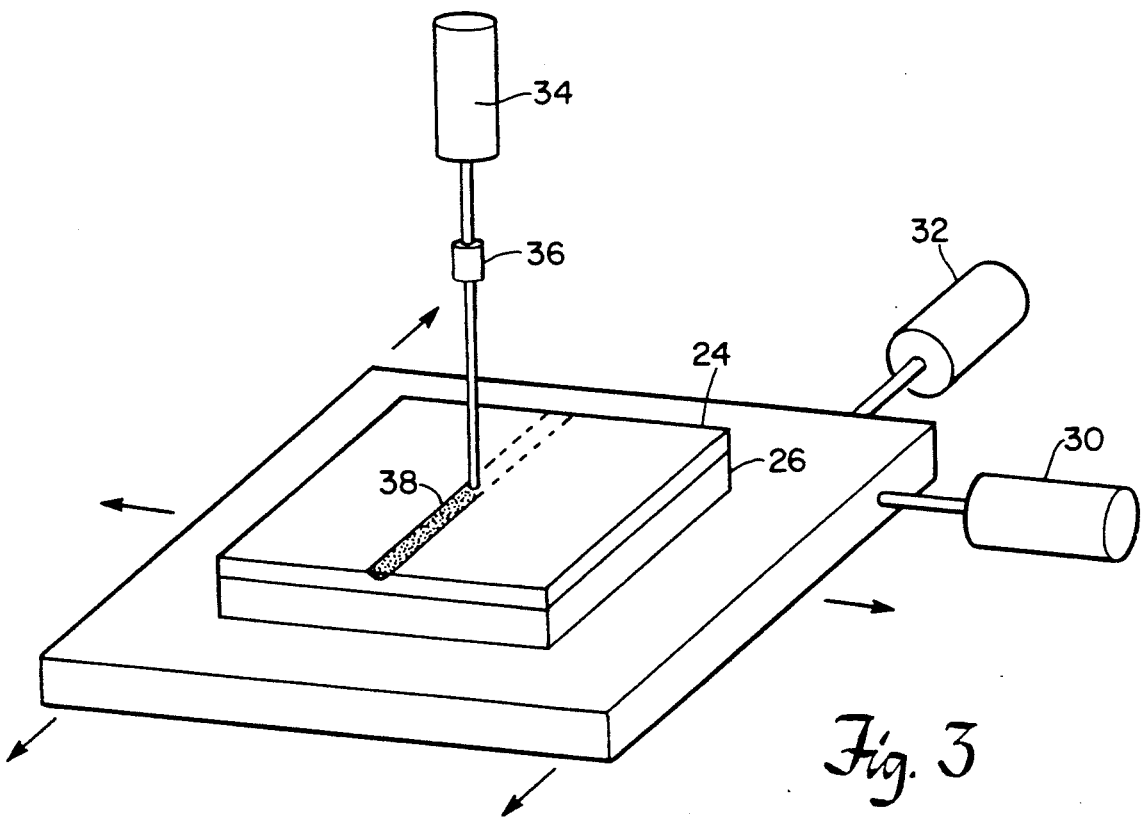
FIG. 3 is a schematic diagram of a laser and an X,Y table for irradiating a predetermined path on the silica layer formed on the substrate in FIG. 1.

A conventional flame hydrolysis deposition system 16, FIG. 2, employs a dopant delivery system 18 and torch 20 which produces a soot plume 22 that deposits a layer 24 of suitably doped silica on substrate 26. Substrate 26 is mounted on X,Y table driven by X drive motor 30 and Y drive motor 32 to enable a laser such as $CO_2$ laser 34 to irradiate through objective lens system 36 a narrow path 38 along layer 24 to locally volatize the dopant along path 38, increasing the index of refraction and creating a waveguide.

In one approach, layer 24a, FIG. 4, may be doped with boron using boron oxide in the proportion of 8 mole % boron oxide to 92 mole % silica. A laser will provide laser light at a wavelength of approximately $10\mu$ to volatize the boron and raise the index of refraction from its original level of 8 mole %, where the boron dopant is present in the silica, to 0–1 mole %, where the boron dopant has been removed. The boron will be sufficiently volatized at 1600°–1700° C. to effect the necessary change in the index of refraction.

Figure 5:
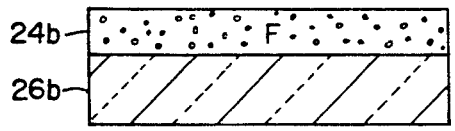
FIG. 5 is a view similar to FIG. 4 utilizing a fluorine doped silica layer.

In a similar approach, FIG. 5, layer 24b may be doped with fluorine to yield a refractive index difference of ($\Delta n = -0.34\%$) from pure fused silica. The preferred wavelength here is $10\mu$. With the fluorine present, layer 24b will have an index of refraction of 1.4535, whereas in the local area where the fluorine has been volatized the index of refraction will be raised to 1.4585. The temperature at which volatization of fluorine takes place is approximately 1600° C. In this process the volatization must take place in an oxygen atmosphere because the fluorine is replaced by oxygen.

Figure 6:
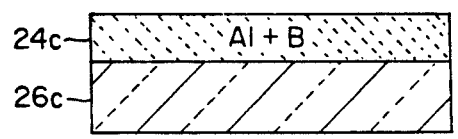
FIG. 6 is a view similar to FIG. 4 and FIG. 5 wherein the dopant medium includes aluminum and boron.

In an alternative construction, FIG. 6, layer 24c may be doped with aluminum and boron in the amounts of 5 mole % each. Since aluminum increases the index of refraction and boron decreases the index of refraction, and since boron is the more volatile of the two dopants, when it is volatized it leaves behind an excess of aluminum which dominates and causes an increase in the index of refraction along the path. In yet another construction, FIG. 7, layer 24d may include aluminum and phosphorous plus a rare earth dopant such as neodymium. Aluminum and phosphorous have a peculiar effect, since each of those separately tends to dramatically raise the index of refraction of the silica layer 24d. However, when combined together the aluminum and phosphorous ions pair, forming an AlPO$_4$-like unit which replaces two silicon tetrahedra and forms a matrix very similar to the SiO$_2$ matrix. If the aluminum and phosphorous are contained in equimolar parts then the resultant glass has an index of refraction lower than that of pure fused silica, even though aluminum and phosphorous are both index-raising dopants. If the glass composition is aluminum-rich, such as where the proportion is aluminum 6 mole % to phosphorous 3 mole %, then the index of refraction is determined by the amount of aluminum that is not associated with the phosphorous, so that when the phosphorous is volatized and driven off, at a temperature of 1600° C. for example, using a laser having a wavelength of 10μ, the index of refraction, which has been at or slightly above that of the doped silica layer 24d, will now rise substantially above that, creating a waveguide.

Figure 7:
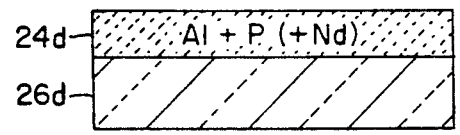
FIG. 7 is a view similar to FIGS. 4–6 in which the dopant medium includes aluminum, phosphorous and the rare earth neodymium.

With aluminum present, such as in an implementations of FIGS. 6 and 7, a rare earth could also be introduced since aluminum is an appropriate codopant for the incorporation of such a rare earth into the glass matrix. This accomplishes two goals: first, the addition of the rare earth transforms the waveguide from a passive one to an active one whereby it can function as an amplifier or a laser. In addition, the presence of the rare earth introduces additional absorption bands. For example neodymium, shown as the rare earth additive in layer 24d, FIG. 7, has absorption bands at 590, 750, 807 and 880 nanometers, and laser transitions at 905, 1060, 1360 and 1400 nanometers. The neodymium or other rare earth can be used to make sure that the glass layer 24c absorbs enough laser energy so that it gets hot enough to reach the temperature necessary to volatize the dopant. For example, an 8 mole percent aluminum, 4 mole percent phosphorous, and 1-3 weight percent neodymium is suggested. The 4% phosphorous will tie up 4% aluminum, leaving 4% aluminum to provide solubility for the neodymium. The index of the glass will be associated with the index raising property of 4% aluminum. A waveguide can be formed by heat treating the glass with a laser tuned to one of the neodymium absorption bands. When the phosphorous is volatized with a laser tuned to one of the neodymium absorption bands, it leaves behind the aluminum-rich glass that is higher in index.

Figure 8:
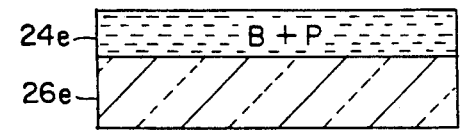
FIG. 8 is a view similar to FIGS. 4–7 in which the dopant medium is boron and phosphorous.
Figure 9:
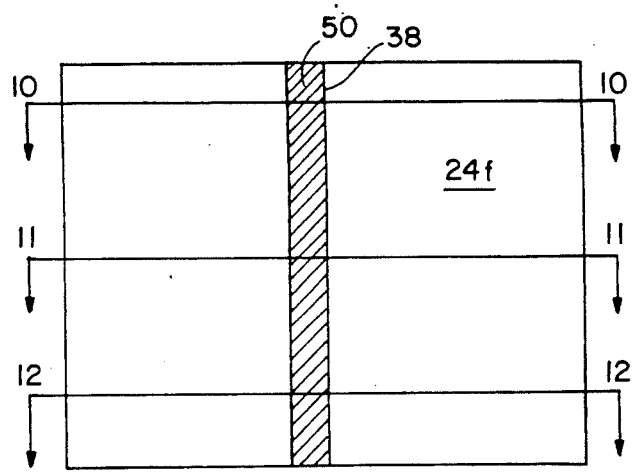
FIG. 9 is a top plan view of a waveguide such as shown in FIG. 3 after completion of the irradiation by the laser.

In yet another approach, FIG. 8, layer 24e can employ boron and phosphorous codopants. In this case the phosphorous is the more volatile element and will be volatized at a temperature of 1600° C. using a laser wavelength of 10μ. With a 6 mole percent boron and a 1 mole percent phosphorous concentration, the volatization will cause loss of more boron than phosphorous simply due to the fact that there is more boron present than phosphorous. Since boron drives the index of refraction down and phosphorous drives it up, the result is an increase in the index of refraction. Also, boron lowers the index of refraction more per mole percent than phosphorous raises the index of refraction per mole percent in a ratio of about 1.4 to 1. Therefore, the loss of equal amounts of boron and phosphorous or the loss of more boron than phosphorous will cause a net increase in the refraction index of the treated area. One of the advantages of this technique is that the waveguide formed is a surface waveguide with very low losses. The surface is smoother after having been heated in the process of volatizing the dopant or dopants. Even below the surface, the waveguide has been formed by a combination of thermal and diffusion processes which leaves smooth boundaries. That is, as the dopant is volatized from the surface of the glass, other dopant from the surrounding area of the layer diffuses from those higher concentration areas into the depleted area, making a uniform gradation. This forms a smooth uniform graded index guide having very low loss. The use of the rare earth such as neodymium allows other shorter wavelengths of laser light to be used so that even narrower, higher resolution waveguides can be fabricated in the doped layer. Further, the absorption losses of other rare earths at the lasing wavelength, especially neodymium, is very low, since neodymium is a four-level system. However, even for three-level systems the absorption losses at the lasing wavelength are low from device considerations and are necessarily minimized. The smooth boundary condition of the waveguide fabricated according to the technique of this invention is graphically depicted in FIG. 9, where layer 24f, shown in top plan view, depicts a path or waveguide 38 which is smooth on its top 50 and also on its boundary 52, as shown in FIGS. 10, 11 and 12, for the full extent of its length along layer 24f. The uniformity of the index of refraction variation along its length is shown by the cross-sectional views of FIGS. 10-12, where the smooth boundary graphically depicted at 52 is shown by illustration 54 as being a smooth transition of index of refraction n over distance x in each case.

Other elements which affect the index of refraction and can be used herein include boron and fluorine, which lower the index of refraction; germanium, aluminum, titanium, zirconium, and phosphorous, which raise the index of refraction; antimony and phosphorous, which raise the index of refraction; and aluminum and phosphorous, which in combination cancel the index-raising property of the individual dopants.

Although thus far the host medium is less volatile than at least one of the dopants, this is not a necessary limitation of the invention. For example, as shown in FIG. 13, layer 24g may include a host medium of silica and a dopant medium including just aluminum. Heating a predetermined path across layer 24g will thus volatize the silica before the aluminum. Since the aluminum has a higher index of refraction, the increased concentration of the aluminum in layer 24g by the loss of silica increases the index of refraction in the designated path and creates a waveguide.

Although thus far the selective volatization has been accomplished using a laser beam to heat a designated path along the layer, this is not a necessary limitation of the invention. Any beam which can heat a selective area, whether it be a particle beam such as a proton beam or a photon beam such as a laser beam, will suffice. Moreover, the use of the beam can be totally eliminated by covering the layer composed of the host medium and dopant medium with a protective insulator, then etching away a path through the insulator so that when heat is applied the more volatile constituent is driven through the gap etched in the insulating layer. This is demonstrated in FIGS. 14–16, where the waveguide layer 24h composed of silica and boron, is covered by a platinum layer 27. Then a waveguide path 38a, FIG. 15, can be etched through insulating layer 27. Following this, the entire device, including substrate 26h, layer 24h, and the insulating layer 27, may be heated to drive off the boron from layer 24h in the exposed region at etched path 38a.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method of forming an optical waveguide comprising:
    forming on a substrate a waveguide layer containing at least one host and a plurality of dopants each of which separately tends to raise the index of refraction of said layer and in combination have an effect on the index of refraction which is less than the cumulative effect of each of the dopants; and
    heating said waveguide layer to selectively volatize the more volatile of said dopants along a path raising the index of refraction and creating a waveguide along the path.

2. The method of forming an optical waveguide of claim 1 in which forming includes depositing said layer.

3. The method of forming an optical waveguide of claim 1 in which one of said hosts is silica.

4. The method of forming an optical waveguide of claim 1 which includes at least one dopant which is more volatile than said host.

5. The method of forming an optical waveguide of claim 1 in which the heating of said waveguide layer to selectively volatize includes irradiating said path with a particle beam.

6. The method of forming an optical waveguide of claim 1 in which the heating of said waveguide layer to selectively volatize includes irradiating said path with a photon beam.

7. The method of forming an optical waveguide of claim 6 in which said photon beam is a laser beam.

8. The method of forming an optical waveguide of claim 1 in which the heating of said waveguide layer to selectively volatize includes covering said layer with a blocking mask which exposes the area of said path and increasing the temperature of said layer to volatize the more volatile medium in the exposed path.

9. The method of forming an optical waveguide according to claim 1 in which said dopants include aluminum and phosphorous and phosphorous is the more volatile dopant relative to aluminum and said host.

10. A method of forming an optical waveguide comprising:
    depositing on a substrate a single, doped silica layer containing plurality of dopants each of which separately tends to raise the index of refraction of said layer and in combination have an effect on the index of refraction which is less than the cumulative effect of each of the dopants; and
    irradiating with a laser beam a path along the layer for heating, and selectively volatizing said at least one volatile dopant and raising the index of refraction of said layer to create a waveguide along the irradiated path.

11. The method of forming an optical waveguide according to claim 1 in which said substrate is silica.

* * * * *